United States Patent
Kluesing et al.

(10) Patent No.: US 10,412,586 B2
(45) Date of Patent: Sep. 10, 2019

(54) LIMITED-FUNCTIONALITY ACCOUNTS

(71) Applicant: Dropbox, Inc., San Francisco, CA (US)

(72) Inventors: Daniel Kluesing, San Francisco, CA (US); Lars Fjeldsoe-Nielsen, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days.

(21) Appl. No.: 14/109,733

(22) Filed: Dec. 17, 2013

(65) Prior Publication Data

US 2015/0172263 A1    Jun. 18, 2015

(51) Int. Cl.
*H04W 12/08* (2009.01)
*H04W 12/06* (2009.01)

(52) U.S. Cl.
CPC .......... *H04W 12/08* (2013.01); *H04W 12/06* (2013.01)

(58) Field of Classification Search
CPC .................................................. G06F 21/6254
USPC .......................................................... 726/26
See application file for complete search history.

(56) References Cited

U.S. PATENT DOCUMENTS

| | | | |
|---|---|---|---|
| 6,856,989 B1 | 2/2005 | Zhou et al. | |
| 8,346,953 B1 | 1/2013 | Hew et al. | |
| 8,762,512 B1* | 6/2014 | Sundaram | G06F 21/6218 709/223 |
| 2003/0212571 A1 | 11/2003 | Sazawa et al. | |
| 2006/0173867 A1* | 8/2006 | Gaucas et al. | 707/100 |
| 2008/0133726 A1 | 6/2008 | Richardson et al. | |
| 2008/0233919 A1* | 9/2008 | Kenney | 455/411 |
| 2008/0320397 A1 | 12/2008 | Do et al. | |
| 2012/0008786 A1* | 1/2012 | Cronk et al. | 380/282 |
| 2012/0134818 A1 | 5/2012 | Sato et al. | |
| 2012/0246226 A1 | 9/2012 | Anandam et al. | |
| 2012/0324002 A1* | 12/2012 | Chen | 709/204 |
| 2012/0331108 A1 | 12/2012 | Ferdowsi et al. | |
| 2013/0046833 A1 | 2/2013 | Riepling et al. | |
| 2013/0166918 A1* | 6/2013 | Shahbazi | H04L 9/0863 713/183 |
| 2013/0173112 A1* | 7/2013 | Takahashi et al. | 701/36 |
| 2013/0219176 A1* | 8/2013 | Akella et al. | 713/165 |
| 2013/0227711 A1 | 8/2013 | MacPherson et al. | |
| 2013/0232189 A1 | 9/2013 | Lewis et al. | |

(Continued)

FOREIGN PATENT DOCUMENTS

| WO | 2012/177253 A1 | 12/2012 |
|---|---|---|
| WO | 2014/143904 A1 | 9/2014 |

OTHER PUBLICATIONS

Introduction to Security Assertion Markup Language 2.0 | WSO2 Inc, p. 1-8 on Mar. 7, 2016 http://wso2.com/library/articles/2014/02/introduction-to-security-assertion-markup-language-2.0/?gclid=CJ2t7Lzsr8sCFQEJaQodqxlKYw.*

(Continued)

*Primary Examiner* — Khalil Naghdali
(74) *Attorney, Agent, or Firm* — Polsinelli PC (57) ABSTRACT

Using a unique identifier from an electronic device to automatically create a limited-functionality account upon a predetermined event. Basing the limitations on the unique identifier that was used to create the limited-functionality account. Removing the limitations placed on a limited-functionality account upon the user of the account providing credentials adequate for the synchronized content management system to be able to enforce various policies.

20 Claims, 7 Drawing Sheets

(56) References Cited

U.S. PATENT DOCUMENTS

| | | | |
|---|---|---|---|
| 2013/0295872 A1 | 11/2013 | Guday et al. | |
| 2013/0333022 A1 | 12/2013 | Torkkel | |
| 2014/0189355 A1 | 7/2014 | Hunter et al. | |
| 2014/0195516 A1 | 7/2014 | Balakrishnan et al. | |
| 2014/0282901 A1* | 9/2014 | Dwan et al. | 726/4 |
| 2014/0282938 A1 | 9/2014 | Moisa | |
| 2014/0282971 A1* | 9/2014 | Gustavson | H04L 63/08 726/7 |
| 2014/0310779 A1 | 10/2014 | Lof et al. | |
| 2015/0039725 A1* | 2/2015 | George | H04L 67/325 709/219 |
| 2015/0113279 A1 | 4/2015 | Andersen et al. | |
| 2015/0134818 A1 | 5/2015 | Kearney et al. | |

OTHER PUBLICATIONS

Amy K. Karlson et al., "Can I Borrow Your Phone? Understanding Concerns When Sharing Mobile Phones," Microsoft Research.

Lori Kaufman, "The Best Free Programs and Online Services for Sending and Sharing Large Files" http://www.howtogeek.com/133761/the-best-free-programs-and-online-services-for-sending-and-sharing-large-files/ , published on Jan. 12, 2013 (Entire article).

Yaara Lancet, "Better Than Dropbox: The 6 Quickest Ways to Share Any File With Anyone", http://www.makeuseof.com/tag/dropbox-quickest-ways-share-file-si/ (published Jul. 17, 2012).

Josh Lowensohn, "How to Save and Share Ridiculously Large Files", http://www.cnet.com/au/how-to/how-to-save-and-shareridiculously-large-files/ (published Mar. 9, 2010).

PCT Search Report and Written Opinion dated Sep. 16, 2015 for Application No. PCT/US2015/040545, filed Jul. 15, 2015, titled, "Unregistered User Account Generation for Content Item Sharing", 11 pages.

Orli Yakuel, "16 Apps That Make Sharing Large Files a Snap", http://techcrunch.com/2009/08/08/16-apps-that-make-sharing-large-files-a-snap/ (published Aug. 8, 2009).

* cited by examiner

LIMITED-FUNCTIONALITY ACCOUNTS

TECHNICAL FIELD

The present technology pertains to content management systems, and more specifically pertains to creating limited-functionality accounts for content management systems.

BACKGROUND

A synchronized content management system can be accessed on electronic devices in a variety of ways such as a stand-alone application, one or more application plug-ins, a web browser, etc. Also, electronic device manufacturers oftentimes preinstall software for interacting with a synchronized content management system. However, too often users do not take advantage of the ability to manage their content in the synchronized content management system because of one or more barriers, such as a lack of understanding of the system, perceived or actual cost, setup over head, etc. Therefore, a solution is needed that decreases user burden in setting up an account to interact with the system.

Also, a synchronized content management system can support an ecosystem of users and can be used to share content between the users. To facilitate a high-quality user experience, strong identifier can be used to identify the users within the ecosystem. For example, if content management system can identify the source of messages being sent within the ecosystem by referencing the login credentials of the author of those messages the content management system can enforce rules that prohibit users from sending unwanted messages, harassing other users, etc. However, a requirement for login credentials that can uniquely identify a user within the ecosystem of a synchronized content management system will itself serve as a barrier to some users choosing to take advantage of the system. Therefore, a solution to the problem identified above for initializing an account must also allow for accounts that can ensure a high-quality user experience.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for using a unique identifier from an electronic device to create a limited-functionality account. The limited-functionality account can be created upon a predetermined event such as power-on, launching a synchronized content management system in a first instance on the device, taking a photo, etc. Thus, creation of the limited-functionality account can require no login credentials, thereby providing a simple, user-friendly interface for initiating interactions with the synchronized content management system.

Also, a limited-functionality account can be created with one or more built-in limitations based on the unique identifier type. The built-in limitations can ensure that a user of a limited-functionality account cannot degrade the experience of other users of the synchronized content management system.

Some embodiments of the disclosed technology involve detecting a predetermined event in an electronic device such as detecting a first power up of the electronic device, detecting a first instance of an application for accessing a synchronized content management system opening on the electronic device, detecting a first instance of an image being captured using a camera on the electronic device, detecting a first instance of audio being captured using a audio recorder on the electronic device, detecting a content item being saved in a first instance in a content item editor on the electronic device, etc.

Upon the detection of such an event, the synchronized content management system can automatically create a limited-functionality user account based on a unique identifier of the electronic device such as a hardware identifier associated with a device, a phone number associated with the device, etc.

Based on the identifier used to create the account, the synchronized content management system can place one or more limitations on the limited-functionality account. For example, the limitations can involve one or more restrictions including a restriction on the ability to generate share links using the synchronized content management system, a restriction on the ability to send generated share links in a notification to another user of the synchronized content management system, a restriction on the ability to use the synchronized content management system to send generated share links outside of the synchronized content management system.

Some embodiments of the disclosed technology also involve removing the limitations placed on a limited-functionality account upon the user of the account providing credentials adequate for the synchronized content management system to be able to enforce various policies. In the case of a user without an existing full-functionality account, removing limitations can involve receiving adequate credentials and converting the limited-functionality user account to a full-functionality user account. Similarly, in the case of a user of a limited-functionality account that also has an existing full-functionality account, removing limitations can involve receiving the login credentials associated with the existing full-functionality user account and merging the limited-functionality user account into the existing full-functionality user account, thereby removing the one or more limitations.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for automatically creating a user account without first requiring an extensive signup process and the need for creating accounts with built-in limitations that can ensure a high-quality user experience for an ecosystem of users.

Accordingly, some embodiments of the disclosed technology involve using a unique identifier from an electronic device to create a limited-functionality account. The limited-functionality accounts can be created upon a predetermined event such as power-on, launching a synchronized content management system in a first instance on the device, taking a photo, etc. Thus, creation of the limited-functionality account can be automatic and require no login credentials, thereby providing a simple, user-friendly interface for initiating interactions with the synchronized content management system.

Also, a limited-functionality account can be created with one or more built-in limitations based on the unique identifier type. The built-in limitations can ensure that a user of a limited-functionality account cannot degrade the experience of other users of the synchronized content management system.

Figure 1:
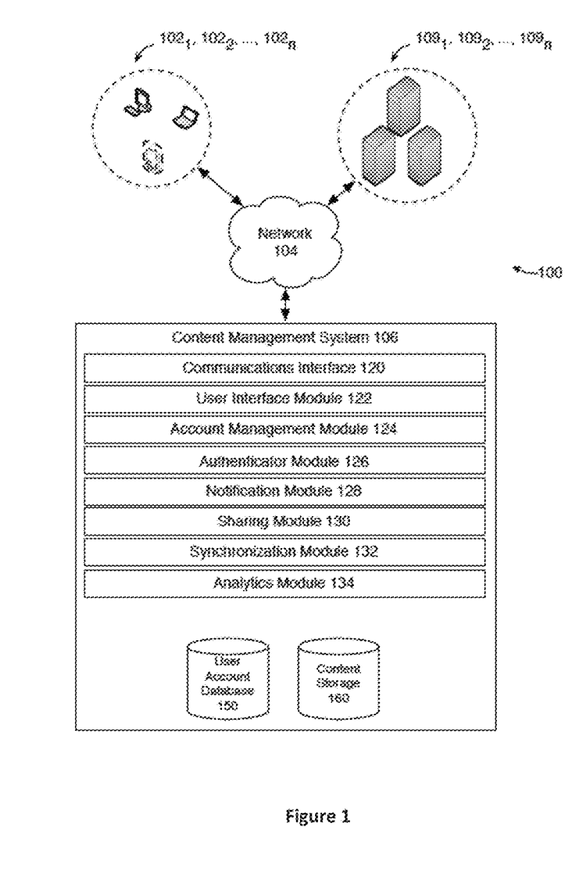
FIG. 1 shows an exemplary system configuration implementing various embodiments of the disclosed technology.

With respect to implementing various embodiments of the disclosed technology, an exemplary system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device 102.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information. For example, the user account database 150 can store other identifiers (e.g. phone number, hardware identifiers, MAC address, etc.) that uniquely identify an electronic device, as explained in more detail below.

User account database 150 can also include account management information, such as account type, e.g. free, paid, or limited-functionality; usage information, e.g. file edit history; maximum storage space authorized; storage space used; content storage locations; security settings; personal configuration settings; content sharing data; account limitations (explained in greater detail below); etc. Account management module 124 can be configured to update and/or obtain user account details in user account database 150. For example, the account management module 124 can be configured to convert a limited-functionality account to a full-functionality account and to merge a limited-functionality account into an existing full-functionality account, as explained in greater detail below. The account management module 124 can be configured to interact with any number of other modules in content management system 106.

An account can be used to store content, such as digital data, documents, text files, audio files, video files, etc., from one or more client devices 102 authorized on the account. The content can also include folders or other mechanisms of grouping content items together with different behaviors, such as collections, playlists, albums, etc. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, unique identifiers (e.g. phone numbers, hardware identifiers, MAC addresses, etc) security tokens, API calls, specific client devices, and so forth, to ensure only authorized clients and users can access files. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

Content management system 106 can perform various types of sharing functions including in-band sharing and out-of-band sharing. Out-of-band sharing can involve sharing module 130 generating a share link to a content item and a user sending that share link to others using a client application or browser-based application rather than sharing the link via content management system 106.

Out-of-band sharing can involve generating a share link with sharing module 130, copying the share link, and sending the link to one or more recipients in a text message, using a social media application, via an email client, as a micro-blogging post, etc.

In-band sharing can include sharing between users of content management system 106 using an interface associated with content management system 106 via a client-side application or via a webpage displayed using a web browser application. In-band sharing can include content management system 106 sending notifications to other users as well as sending messages (e.g. email messages) that include a share link generated by sharing module 130 to members outside of the ecosystem. Such messages can appear to the recipient to have been sent via content management system 106.

Content management system 106 can also include notification module 128 for in-band sharing. For example, notification module 128 can send notifications and share links (i.e. a URL generated by sharing module 130) between users having accounts with content management system 106, such as via computing devices in network communication with content management system 106.

While content management system 106 is presented with specific components, it should be understood by one skilled in the art, that the architectural configuration of system 106 is simply one possible configuration and that other configurations with more or less components are also possible.

Content management system 106 can be configured to create limited-functionality user accounts. For example, upon the occurrence of a predetermined event (e.g. during the un-boxing experience for a new electronic device when a user first powers up the electronic device) a limited-functionality account can be automatically created. This limited-functionality account can be linked to the electronic device. Also, in some embodiments of the present technology, the limited-functionality account can only be accessed using that electronic device.

The limited-functionality account can be accessed on the electronic device via a client-side application or via a webpage displayed using a web browser application. Also, the limited-functionality account can be accessed without the user having to enter login credentials or any other information, thereby removing a barrier to entry into content management system 106.

A limited-functionality account can be used to upload content to content management system 106, retrieve content from content management system 106, and share content via content management system 106 the same way as a full-functionality account subject to one or more limitations placed on the limited-functionality account.

A limited-functionality account can later be converted to a new full-functionality account or merged with another existing full-functionality account. For example, upon a user providing content management system 106 credentials (e.g. user name and password), the limited-functionality account can become a full-functionality account and the one or more limitations previously placed on the account can be lifted.

Also, depending on whether or not the credentials are already associated with an existing full-functionality account with content management system 106, the limited-functionality account can either be merged with the existing full-functionality account or converted into a new full-functionality account.

Figure 2:
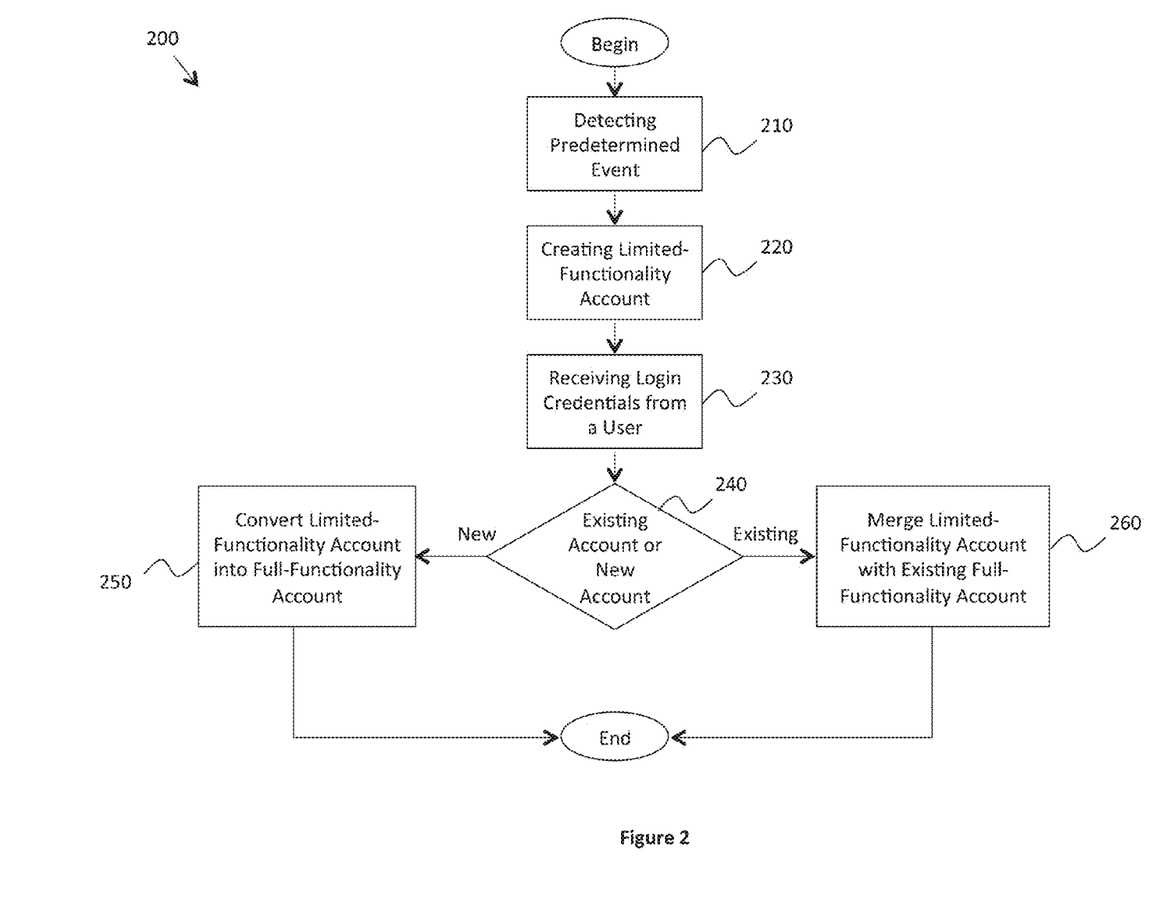
FIG. 2 shows an exemplary method of creating a limited-functionality account and later converting or merging the limited-functionality account into a full-functionality account.

FIG. 2 shows exemplary method 200 for creating a limited-functionality account and later converting or merging the limited-functionality account into a full-functionality account. Method 200 involves detecting a predetermined event at block 210. The predetermined event can include a plurality of event types that can occur on an electronic device such as powering up an electronic device in a first instance, opening a client side application for accessing a content management system in a first instance, taking a photo or video using the electronic device, recording audio using the electronic device, saving a content item using a content editor, etc. Types of predetermined events are discussed in greater detail below.

Upon detecting a predetermined event, method 200 can involve creating a limited-functionality account at block 220. In some embodiments of the disclosed technology, creating a limited-functionality account can involve using an identifier that is unique to the electronic device to identify the limited-functionality account with a content management system. For example, types of identifiers can include phone numbers associated with a mobile electronic device, hardware identifiers associated with an electronic device, a MAC address, etc.

Once the limited-functionality account is created, it can be used to upload, retrieve, and share content via content management system in the same way as a full-functionality account subject to one or more limitations placed on the limited-functionality account. Indeed, the types of limitations placed on a limited-functionality account can be dictated by what identifier is used to create the limited-functionality account, as will be discussed in greater detail below. However, a user of a limited-functionality account can take advantage of the content management system's full functionality by registering credentials with or otherwise providing credentials to the content management system. As shown in FIG. 2, method 200 involves receiving login credentials from a user at block 230. For example, login credentials can include username, password, email address, etc.

At block 240, a determination is made whether the login credentials are associated with an existing full-functionality account or whether they are being entered in a first instance in order to create a new full-functionality account. When the login credentials are being entered in first instance, method 200 involves converting the limited-functionality account into a full-functionality account at block 250. When the login credentials are already associated with an existing full-functionality account, method 200 involves merging the limited-functionality account with the full-functionality account at block 260.

Method 200 can be performed by a content management system such as content management system 106. Also, although specific steps are shown in FIG. 2, in other embodiments the method can have more or fewer steps.

As explained above, a high-quality user experience in an ecosystem of connected users can include ensuring that users are not sending unwanted messages (e.g. unsolicited advertisements), harassing other users, etc. Accordingly, some embodiments of the present technology involve placing limitations on accounts that are automatically created using identifiers that do not adequately identify users in the ecosystem. Indeed, the types of limitations placed on a limited-functionality account can be dictated by what identifier is used to create the limited-functionality account.

For example, full-functionality can be provided for accounts that are created using an email address and password since the users can be held accountable for harassing or malicious behavior via their email account. Similarly, a moderate level of functionality can be provided for accounts that are created using a phone number and a low level of functionality can be provided for accounts using weaker identifiers, such as a hardware identifier or MAC address.

A content management system can specifically enforce limitations on the extent users can share content based on a type identifier used to create the account. As explained above, a content management system can generate share links to share via in-band sharing and out-of-band sharing. Accordingly, some embodiments of the present technology involve determining whether to provide the basic ability to generate links to content, the ability for in-band sharing, and the ability for out-of-band sharing based on the identifier type used to create the account.

Figure 3:
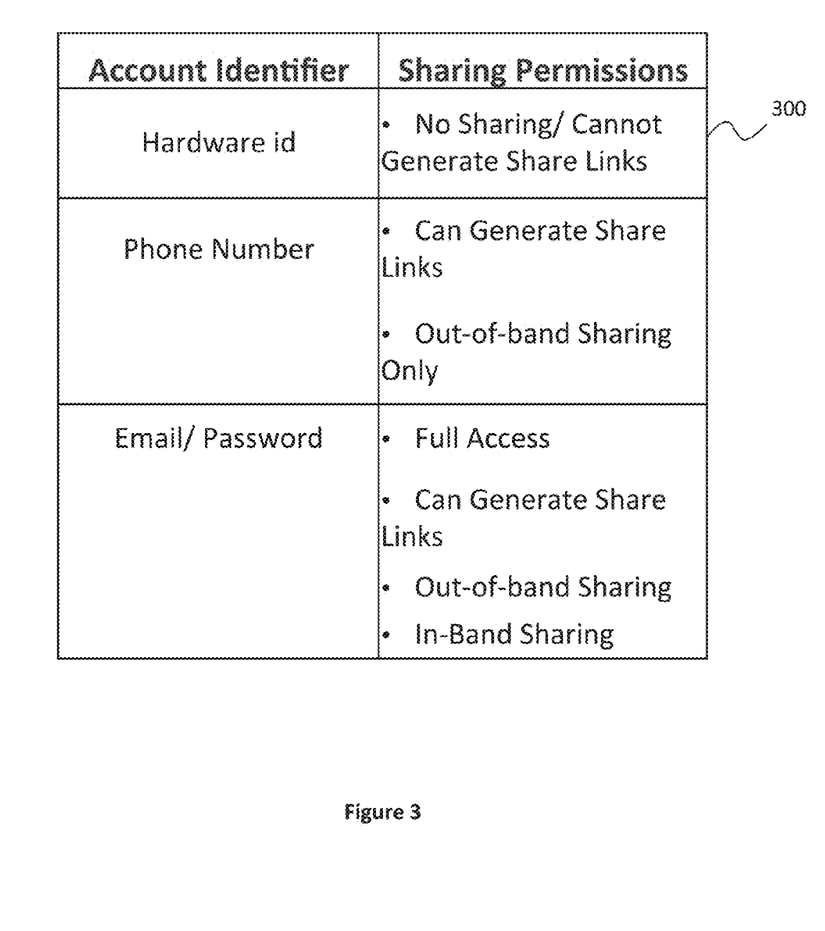
FIG. 3 shows a diagram of various unique identifiers and corresponding limitations placed on limited-functionality accounts according to some embodiments of the present technology.

FIG. 3 shows a diagram 300 of various unique identifiers and corresponding limitations placed on limited-functionality accounts according to some embodiments of the disclosed technology. As shown, when a hardware identifier is used to create a limited-functionality account with a content management system, the account will not have sharing permissions. Therefore, a user of the limited-functionality account will not be able to generate share links. When a phone number is used to create a limited-functionality account, the content management system will allow the user to generate share links, but will only allow out-of-band sharing. Finally, when an account is created using an email address and a password, the account can be a full-functionality account with the ability to generate share links for in-band and out-of-band sharing.

Figure 4:
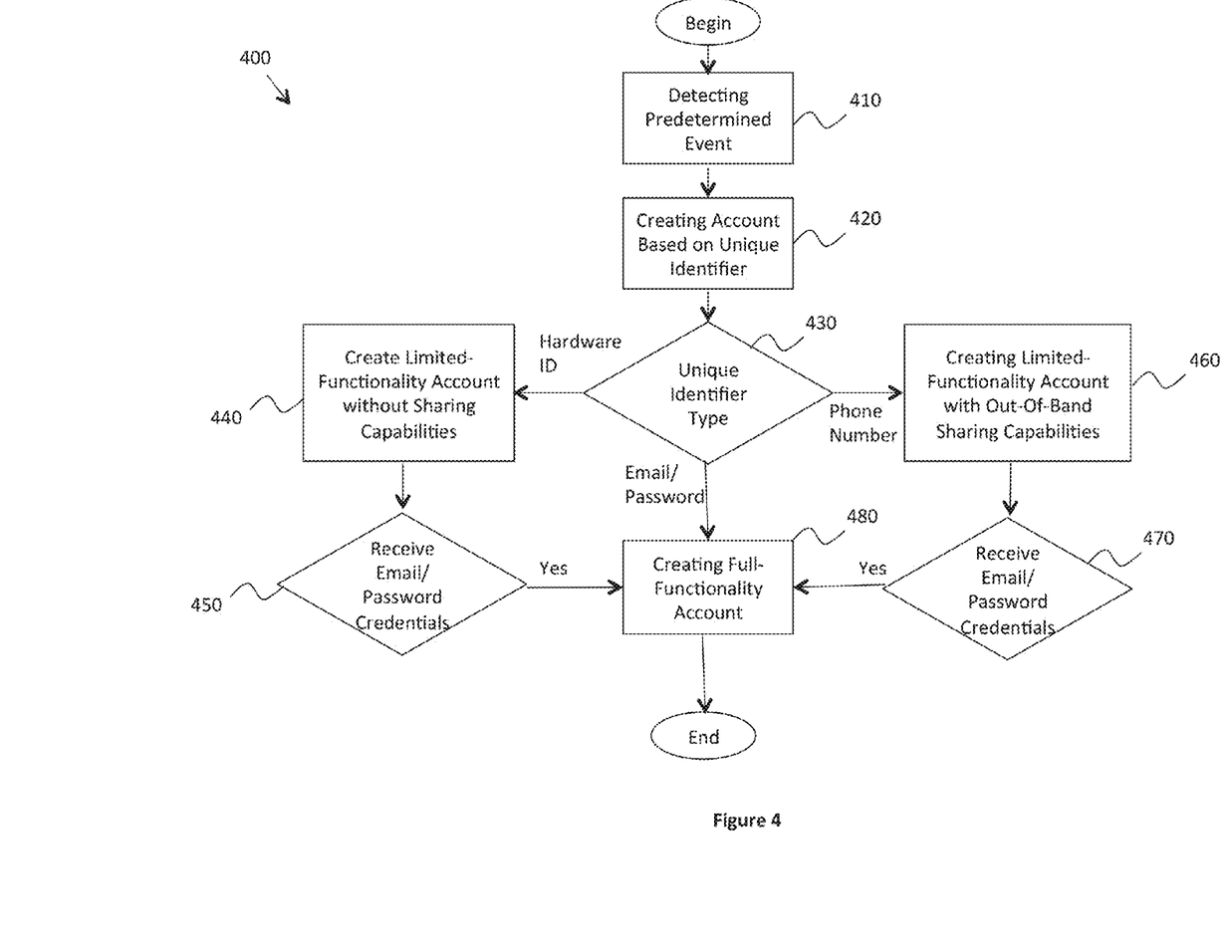
FIG. 4 shows an exemplary method of account creation and permissions granting based on an identifier.

FIG. 4 shows exemplary method 400 of account creation and permissions granting based on an identifier. Method 400 involves detecting a predetermined event at block 410 and creating an account based on a unique identifier at block 420. Next, method 400 determines an account type based on the unique identifier at block 430. When an email address and password are used as an identifier, method 400 involves creating a full-functionality account at block 480.

When a hardware identifier is used to create the account, method 400 involves creating a limited functionality account without sharing capabilities at block 440. Method 400 then determines whether an email address and password are subsequently provided at block 450. If so, method 400 involves creating a full-functionality account at block 480.

When a phone number is used to create the account, method 400 involves creating a limited functionality account with out-of-band sharing capabilities at block 460. Method 400 then determines whether an email address and password are subsequently provided at block 470. If so, method 400 involves creating a full-functionality account at block 480.

Method 400 can be performed by a content management system such as content management system 106. Also, although specific steps are shown in FIG. 4, in other embodiments the method can have more or fewer steps.

As explained above, some embodiments of the disclosed technology involve automatically creating a limited-functionality account upon detecting a predetermined event. Detection of a predetermined event can involve a content management system receiving a signal from an electronic device indicating the occurrence of a predetermined event and creating the limited-functionality account in the content management system. Also, detection of a predetermined event can involve an electronic device detecting the predetermined event, the electronic device automatically creating a limited-functionality account, the electronic device sending the content management system information for the limited-functionality account, and the content management system using an account management module for registering the limited-functionality account in a user account database.

A wide variety of predetermined events can be used to cause the creation of a limited-functionality account including powering up an electronic device in a first instance, opening a client side application for accessing a content management system in a first instance, taking a photo or video using the electronic device, recording audio using the electronic device, saving a content item using a content editor, etc. Although specific examples of predetermined events are disclosed herein, those with ordinary skill in the art having the benefit of the present disclosure will readily appreciate that other predetermined events, now known or later developed, can be used to trigger account creation.

In some embodiments of the disclosed technology, predetermined events are selected such that, upon their occurrence, a user of an electronic device will naturally appreciate the benefits and ease of use of a content management system. For example, taking a photograph can constitute a predetermined event. Indeed, a user of a mobile electronic device using the device to take a photograph and can be prompted with a user interface element that can alert a user that an account with a content management system has automatically been created for him. The user interface element can also guide the user through a tutorial explaining the benefits of storing his photographs in the content management system.

Figure 5:
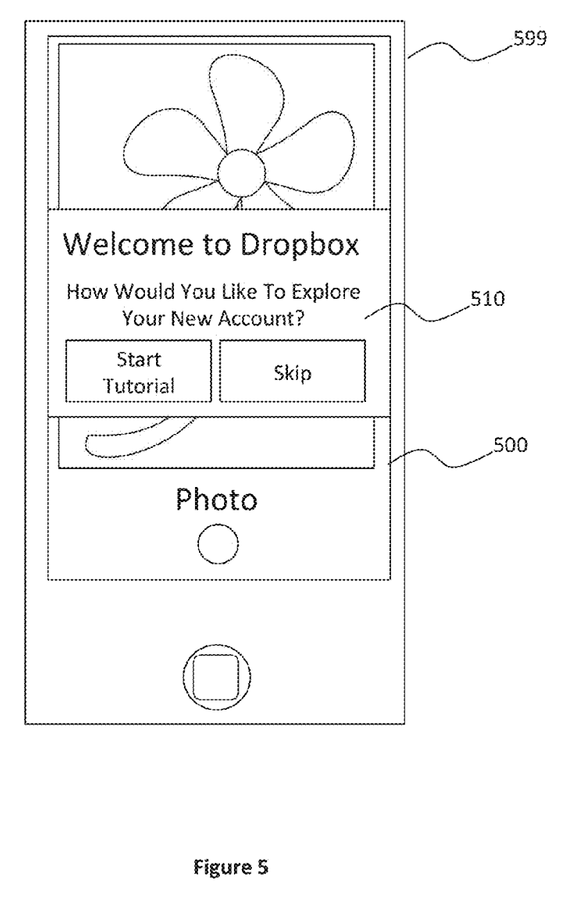
FIG. 5 shows an exemplary user interface showing an interface element for creating a limited-functionality account upon the occurrence of a predetermined event.

FIG. 5 shows exemplary user interface 500 showing interface element 510 for creating a limited-functionality account upon the occurrence of a predetermined event. As in the case of interface element 510, the predetermined event can involve detecting the use of mobile device 599 to take a photograph or video. Interface element 510 can notify the user that an account has been created for him and can provide the user with selectable options 520, 530 for beginning interactions with a content management system.

Figure 6A:
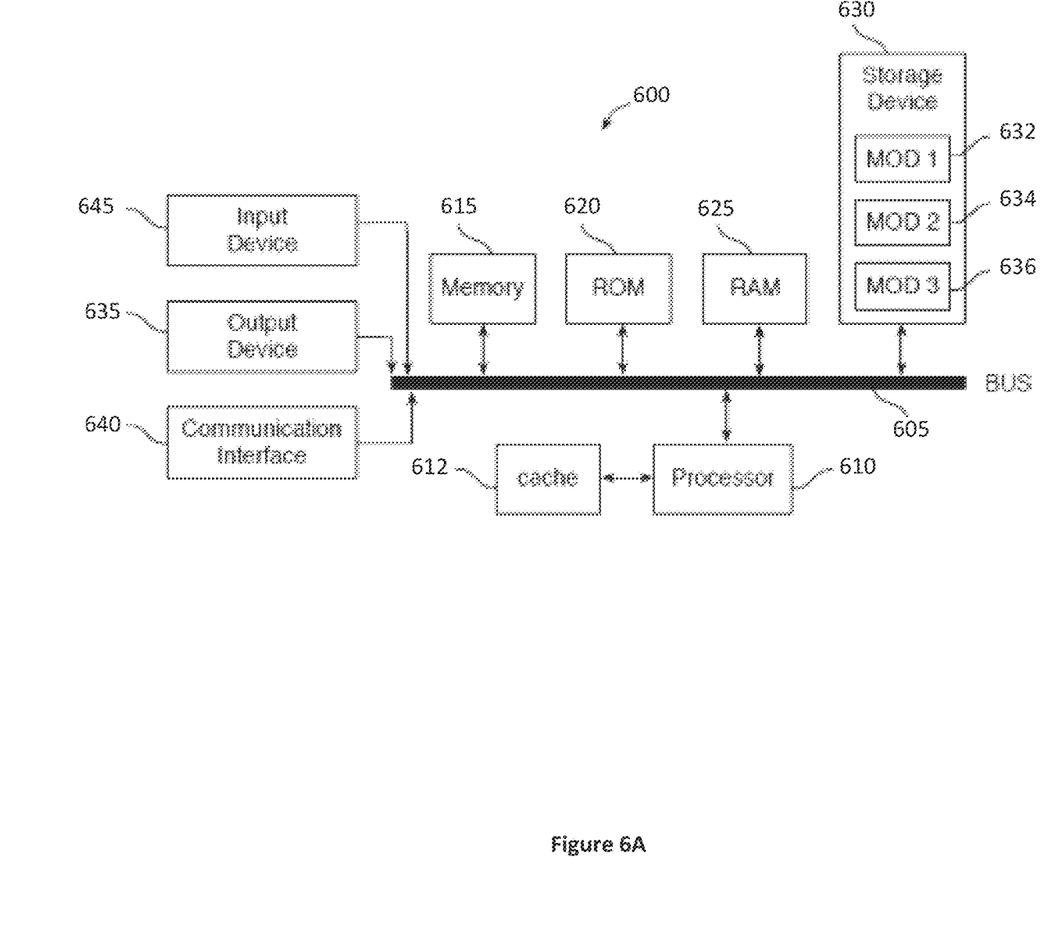
FIG. 6A illustrates a conventional system bus computing system architecture wherein the components of the system are in electrical communication with each other using a bus.
Figure 6B:
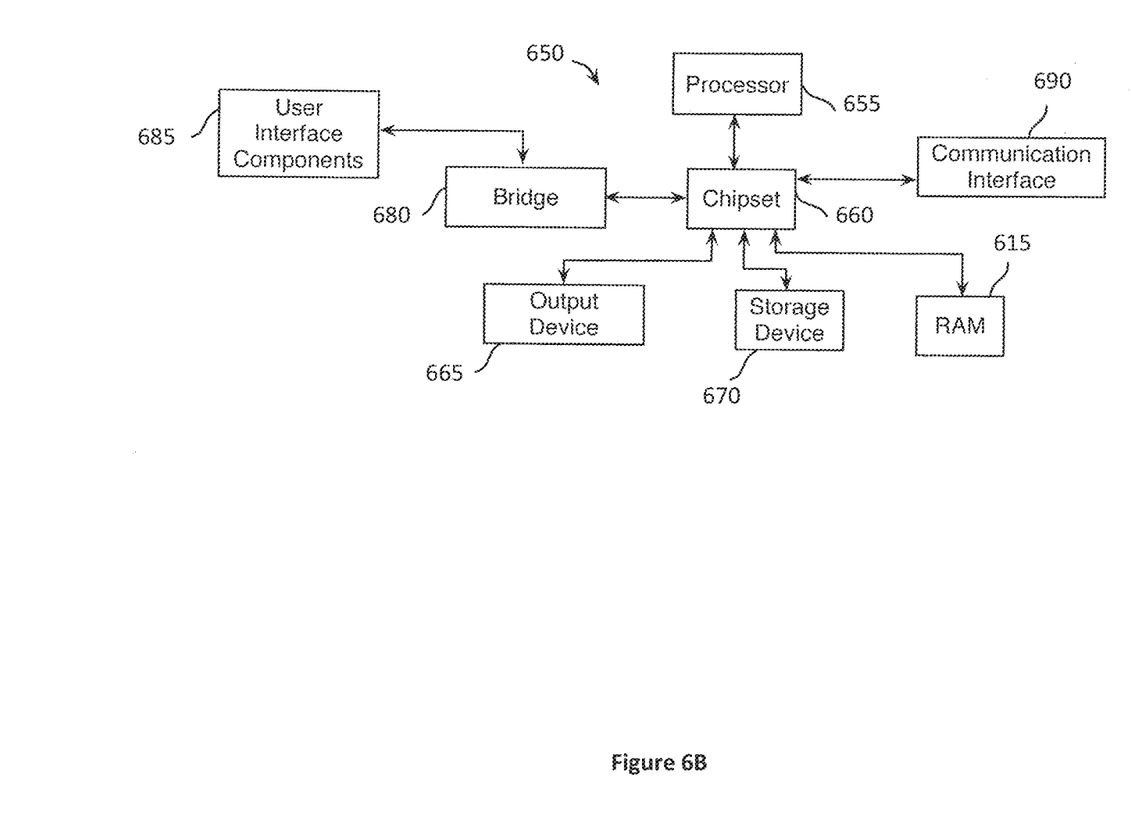
FIG. 6B illustrates a computer system having a chipset architecture that can be used in executing the described method and generating and displaying a graphical user interface (GUI).

6A and FIG. 6B show exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:

creating, by a content management system, a first type of user account, the first type of user account having a first level of functionality enabling both out-of-band sharing of content items on the content management system and in-band sharing of content items on the content management system;

creating, by the content management system, a second type of user account, the second type of user account having a second level of functionality enabling a first one of the out-of-band sharing of content items or the in-band sharing of content items and disabling a second one of the out-of-band sharing of content items or the in-band sharing of content items;

receiving, by the content management system, respective client signals from respective client devices and, based on respective client identification data associated with the respective client devices, determining respective types of identifiers associated with the respective client devices;

in response to determining that a respective type of identifier associated with a first client device comprises user credentials, registering, by the content management system, the first type of user account for the first client device based on the user credentials;

receiving, from the first client device, a first content item at the content management system and storing the first content item at the content management system in the first type of user account;

in response to determining that the respective type of identifier associated with a second client device comprises a phone number, registering, by the content management system, the second type of user account for the second client device based on the phone number;

receiving, from the second client device, a second content item at the content management system and storing the second content item at the content management system in the second type of user account;

enabling, by the content management system, both out-of-band sharing of the first content item on the content management system and in-band sharing of the first content item on the content management system; and enabling, by the content management system, the first one of the out-of-band sharing of the second content item or the in-band sharing of the second content item and disabling the second one of the out-of-band sharing of the second content item or the in-band sharing of the second content item.

2. The method of claim 1, further comprising:
creating, by the content management system, a third type of user account, the third type of user account having a third level of functionality disabling all sharing capabilities on the content management system; and
in response to determining that the respective type of identifier associated with a third client device comprises a device identifier that is different from the phone number, registering, by the content management system, the third type of user account for the third client device.

3. The method of claim 2, wherein creating, by the content management system, the third type of user account comprises creating, by the content management system, a limited user account for the third client device based on the device identifier, wherein the device identifier comprises a media access control (MAC) address associated with the third client device, and wherein the limited user account is an only user account at the content management system that is associated with the media access control address associated with the third client device.

4. The method of claim 2, further comprising:
receiving, from the third client device associated with the third type of user account, the user credentials associated with the first type of user account, the user credentials comprising a password; and
in response to receiving the user credentials from the third client device, converting, by the content management system, the third type of user account into the first type of user account to yield a converted user account having the first level of functionality enabling the sharing capabilities on the content management system.

5. The method of claim 2, wherein disabling all sharing capabilities comprises disabling an ability to generate links to content items on the content management system and an ability to send, to other user accounts on the content management system, generated links to content items on the content management system.

6. The method of claim 2, wherein creating, by the content management system, the third type of user account comprises creating, by the content management system, a limited user account and registering the limited user account for use only by the third client device associated with the device identifier, wherein the limited user account is not linked to a particular user identity or account at the content management system.

7. The method of claim 1, wherein the in-band sharing comprises sending content sharing links through the content management system and out-of-band sharing comprises sending content sharing links outside of the content management system, and wherein disabling the second one of the out-of-band sharing of the second content item or the in-band sharing of the second content item comprises restricting an ability to send content sharing links through the content management system or restricting the ability to send content sharing links outside of the content management system.

8. The method of claim 1, further comprising:
determining a respective type of user account to create by the content management system for each of the respective client devices based on different access rules defined for different types of identifiers, the different access rules comprising a first rule enabling both out-of-band sharing of content items and in-band sharing of content items for user accounts created with user credentials, a second rule disabling the second one of the out-of-band sharing or the in- band sharing for user accounts created based on an associated phone number, and a third rule disabling all sharing for user accounts created based on an associated device identifier and without an associated phone number or user credentials.

9. The method of claim 1, further comprising:
creating, by the content management system, respective types of user accounts, wherein each respective type of user account comprises a respective level of functionality;
creating, by the content management system, a third type of user account having a third level of functionality, wherein the first level of functionality, the second level of functionality and the third level of functionality provide different sharing capabilities for content items on the content management system;
registering, by the content management system, the respective client devices to the first type of user account having the first level of functionality when the respective type of identifier of the respective client devices comprises the user credentials, the user credentials comprising a password for the first type of user account;
registering, by the content management system, the respective client devices to the second type of user account having the second level of functionality when the respective type of identifier of the respective client devices comprises the phone number and does not include user credentials; and
registering, by the content management system, the respective client devices to the third type of user account having the third level of functionality when the respective type of identifier of the respective client devices comprises a devices identifier that is different from the phone number.

10. The method of claim 1, wherein the respective client signals are associated with a predetermined event set to trigger the content management system to register respective user accounts to the respective client devices, the predetermined event comprising at least one of:
detecting a device power up; or
detecting an image being captured using a camera.

11. A content management system comprising:
one or more hardware processors; and
at least one non-transitory computer-readable medium storing instructions that, when executed by the one or more hardware processors, cause the content management system to:
create a first type of user account on the content management system, the first type of user account having a first level of functionality enabling both out-of-band sharing of content items on the content management system and in-band sharing of content items on the content management system;
create a second type of user account on the content management system, the second type of user account having a second level of functionality enabling a first one of the out- of-band sharing of content items or the in-band sharing of content items and disabling a second one of the out-of-band sharing of content items or the in-band sharing of content items;
receive, by the content management system, respective client signals from respective client devices and, based on respective client identification data associated with the respective client devices, determine respective types of identifiers associated with the respective client devices;

in response to determining that a respective type of identifier associated with a first client device comprises user credentials, register, based on the user credentials, the first type of user account on the content management system for the first client device;

receive, from the first client device, a first content item at the content management system and store the first content item at the content management system in the first type of user account;

in response to determining that the respective type of identifier associated with a second client device comprises a phone number, register, based on the phone number, the second type of user account on the content management system for the second client device;

receive, from the second client device, a second content item at the content management system and store the second content item at the content management system in the second type of user account;

enable, by the content management system, both out-of-band sharing of the first content item on the content management system and in-band sharing of the first content item on the content management system; and enable, by the content management system, the first one of the out-of-band sharing of the second content item or the in-band sharing of the second content item and disable the second one of the out-of-band sharing of the second content item or the in-band sharing of the second content item.

12. The content management system of claim 11, the at least one non-transitory computer-readable medium storing instructions that, when executed by the one or more hardware processors, cause the content management system to:

create a third type of user account on the content management system, the third type of user account having a third level of functionality disabling all sharing capabilities on the content management system; and in response to determining that the respective type of identifier associated with a third client device comprises a device identifier that is different from the phone number, register, based on the device identifier, the third type of user account on the content management system for the third client device.

13. The content management system of claim 12, wherein creating the third type of user account comprises creating a limited user account on the content management, and wherein the limited user account is an only user account at the content management system that is associated with a media access control (MAC) address associated with the respective client devices.

14. The content management system of claim 11, the at least one non-transitory computer-readable medium storing instructions that, when executed by the one or more hardware processors, cause the content management system to:

create a third type of user account on the content management system, the third type of user account having a third level of functionality disabling all sharing capabilities on the content management system;

receive, from a third client device associated with the third type of user account, the user credentials associated with the first type of user account, the user credentials comprising a password; and in response to receiving the user credentials from the third client device, convert the third type of user account into the first type of user account to yield a converted user account having the first level of functionality enabling the sharing capabilities on the content management system.

15. The content management system of claim 11, wherein disabling all sharing capabilities comprises disabling an ability to generate links to content items on the content management system and an ability to send, to other user accounts on the content management system, generated links to content items on the content management system.

16. The content management system of claim 12, wherein creating the third type of user account comprises creating a limited user account on the content management system and registering the limited user account for use only by the third client device associated with the device identifier, wherein the limited user account is not linked to any user or account on the content management system.

17. A non-transitory computer-readable medium having stored therein instructions which, when executed by one or more hardware processors, cause a content management system to:

create a first type of user account on the content management system, the first type of user account having a first level of functionality enabling both out-of-band sharing of content items on the content management system and in-band sharing of content items on the content management system;

create a second type of user account on the content management system, the second type of user account having a second level of functionality enabling a first one of the out-of-band sharing of content items or the in-band sharing of content items and disabling a second one of the out-of-band sharing of content items or the in-band sharing of content items;

create a third type of user account on the content management system, the third type of user account having a third level of functionality disabling all sharing capabilities on the content management system;

receive respective client signals from respective client devices and, based on respective client identification data associated with the respective client devices, determine respective types of identifiers associated with the respective client devices;

in response to determining that a respective type of identifier associated with a first client device comprises user credentials, register the first type of user account on the content management system for the first client device based on the user credentials;

receive, from the first client device, a first content item at the content management system and store the first content item at the content management system in the first type of user account;

in response to determining that the respective type of identifier associated with a second client device comprises a phone number and user credentials associated with the second client device are unavailable at the content management system, register the second type of user account on the content management system for the second client device based on the phone number;

receive, from the second client device, a second content item at the content management system and store the second content item at the content management system in the second type of user account;

enable, by the content management system, both out-of-band sharing of the first content item on the content management system and in-band sharing of the first content item on the content management system;

enable, by the content management system, the first one of the out-of-band sharing of the second content item or the in-band sharing of the second content item and disable the second one of the out-of-band sharing of the second content item or the in-band sharing of the second content item; and in response to determining that the respective type of identifier associated with a third client device comprises a media access control (MAC) address and a respective phone number or user credentials associated with the third client device are unavailable at the content management system, register the third type of user account on the content management system for the third client device.

18. The non-transitory computer-readable storage medium having stored therein instructions of claim 17, wherein the respective client signals are associated with a predetermined event set to trigger the content management system to register respective user accounts on the content management system to the respective client devices, the predetermined event comprising at least one of:

detect an instance of an application accessing the content management system opening on the respective client devices; and detect audio captured by an audio recorder device.

19. The non-transitory computer-readable storage medium having stored therein instructions of claim 17, wherein the in-band sharing comprises sending content sharing links through the content management system and out-of-band sharing comprises sending content sharing links outside of the content management system, and wherein enabling the first one of the out-of-band sharing of content items or the in-band sharing of content items and disabling the second one of the out-of-band sharing of content items or the in-band sharing of content items comprises enabling out-of-band sharing of content items and disabling in-band sharing of content items.

20. The non-transitory computer-readable storage medium having stored therein instructions of claim 17, wherein creating the third type of user account comprises creating a limited user account on the content management system and registering the limited user account for use only by the third client device associated with a device identifier, wherein the limited user account is associated with a particular user or separate user account on the content management system.

* * * * *